(12) United States Patent
Claypole et al.

(10) Patent No.: US 6,768,932 B2
(45) Date of Patent: Jul. 27, 2004

(54) WHEEL MOTOR SYSTEM

(75) Inventors: George M. Claypole, Fenton, MI (US); Bruce Edward Zemke, Bloomfield Hills, MI (US); Cheuk S. Ng, Bloomfield Hills, MI (US); Douglas Lee Wickham, Troy, MI (US); Milos Stakich, Detroit, MI (US); Chris J. Karras, Macomb Township, Macomb County, MI (US); James M. Nagashima, Cerritos, CA (US); Khwaja M. Rahman, Torrance, CA (US); Terence G. Ward, Redondo Beach, CA (US)

(73) Assignee: General Motors Corporation, Detroit, MI (US)

(*) Notice: Subject to any disclaimer, the term of this patent is extended or adjusted under 35 U.S.C. 154(b) by 8 days.

(21) Appl. No.: 10/309,784

(22) Filed: Dec. 4, 2002

(65) Prior Publication Data

US 2003/0159866 A1 Aug. 28, 2003

Related U.S. Application Data

(60) Provisional application No. 60/337,994, filed on Dec. 7, 2001.

(51) Int. Cl.[7] ................................................ G01M 1/38
(52) U.S. Cl. ........................ 700/279; 700/159; 280/781
(58) Field of Search ................................. 700/279, 159, 700/170; 280/781; 152/190, 226

(56) References Cited

U.S. PATENT DOCUMENTS

| | | | |
|---|---|---|---|
| 2,514,460 A | 7/1950 | Tucker | |
| 4,261,510 A | 4/1981 | Andrus | |
| 5,163,528 A | 11/1992 | Kawamoto et al. | |
| 5,453,930 A | 9/1995 | Imaseki et al. | |
| 5,600,191 A | 2/1997 | Yang | |
| 5,633,544 A | 5/1997 | Toida et al. | |
| 5,691,584 A | 11/1997 | Toida et al. | |
| 5,731,669 A * | 3/1998 | Shimizu et al. | 318/139 |
| 5,793,132 A | 8/1998 | Hirose et al. | |
| 5,894,902 A | 4/1999 | Cho | |
| 5,929,596 A * | 7/1999 | Farrell | 320/104 |
| 6,016,856 A | 1/2000 | Hynes | 152/190 |
| 6,184,776 B1 * | 2/2001 | Danek et al. | 338/198 |
| 6,308,757 B1 | 10/2001 | Bright | 152/221 |
| 6,328,123 B1 | 12/2001 | Niemann et al. | 180/65.5 |

FOREIGN PATENT DOCUMENTS

| | | |
|---|---|---|
| CA | 2317818 | 12/2002 |
| GB | 2369503 | 5/2002 |
| JP | 5116546 | 3/1993 |
| JP | 11089178 | 3/1999 |

* cited by examiner

*Primary Examiner*—Leo Picard
*Assistant Examiner*—Kidest Bahta
(74) *Attorney, Agent, or Firm*—Kathryn A. Marra (57) ABSTRACT

A wheel motor traction assembly configured for use on a light duty vehicle adaptable for electric traction. The wheel motor traction assembly includes a wheel, a brake disc operatively connected to the wheel, a motor operatively connected to the wheel and a motor housing operatively connected to the motor. The motor housing has structural connectors for steering and suspension systems on a vehicle chassis and has a brake caliper operatively connected thereto. A parking brake caliper may also be connected to the motor housing for connection to a parking brake cable on the chassis. The motor housing is configured to bear vehicle chassis loads as the motor housing structurally interconnects the wheel to the chassis through the structural connectors.

18 Claims, 10 Drawing Sheets

WHEEL MOTOR SYSTEM

CROSS-REFERENCE TO RELATED APPLICATIONS

This application claims the benefit of U.S. Provisional Application No. 60/337,994 filed Dec. 7, 2001, which is hereby incorporated by reference in its entirety.

TECHNICAL FIELD

The invention relates to a wheel motor traction assembly for use on a light duty vehicle adaptable for electric traction, the wheel motor traction assembly packaged to fit within a light duty vehicle wheel cavity and having mounting structure for vehicle chassis components which integrates vehicle braking, suspension and steering functions.

BACKGROUND OF THE INVENTION

The use of wheel motors on a vehicle allows for precise control of power in and out of each wheel individually, which may result in increased traction control, improved drivability, handling and braking. It may be desirable to use wheel motors in vehicles that are adaptable for electric traction, such as vehicles with an electric battery power supply, a fuel cell, or hybrid combinations of a fuel cell, an electric battery power supply or an internal combustion engine. A reduction in tire slip losses achieved through the use of wheel motors may result in improved fuel economy. The use of wheel motors may result in improved vehicle packaging by conceivably eliminating the need for an inboard motor with gear reduction, drive shafts, motor mounts, and a differential. Designing a wheel motor with sufficient continuous and peak power capabilities to drive a light duty vehicle while minimizing size, weight and total unsprung mass (i.e., mass axially outward, or on the tire and wheel side, of the vehicle suspension system) has proven to be an ongoing challenge. Standard light duty vehicle wheel space limitations, requisite strength to withstand vehicle chassis loading and sufficient connectability to vehicle chassis components are further design considerations.

SUMMARY OF THE INVENTION

A wheel motor traction assembly for use on a light duty vehicle chassis includes a wheel and an electric motor that is operatively connected within a wheel cavity for drivingly rotating the wheel and has a nonrotatable motor housing. The motor housing is configured to substantially close an inward end of the inwardly open wheel cavity. The non-rotatable motor housing further includes an electrical connector and a structural connector, both being adapted for connecting the wheel motor traction assembly to the chassis. There is a suspension system structural connector and a steering system structural connector operatively connected to the motor housing configured for connecting the wheel motor traction assembly to a suspension system on a vehicle chassis and a steering system on a vehicle chassis, respectively. The motor housing is configured to bear vehicle chassis loads as the motor housing structurally interconnects the wheel with the chassis through the suspension system structural connector and the steering system structural connector.

The wheel motor traction assembly includes a rotatable wheel that has a radially outer tire support portion and a radially inner hub support portion that are cooperatively configured to define a wheel cavity. The wheel cavity is axially inwardly open with respect to the vehicle chassis and has inner and outer wheel parameters. The wheel is removably connected to the hub such that the wheel is rotatable with the hub. The wheel motor traction assembly also includes a rotor in the wheel cavity between the inner and outer wheel parameters. The rotor is operably connectable to the hub support portion for drivingly rotating the wheel. There is a non-rotatable stator in the wheel cavity between the inner and the outer wheel parameters for drivingly rotating the rotor. The rotor and the stator together are a motor.

A rotatable brake disc is operatively connected to the wheel and to the rotor, and a brake caliper in the wheel cavity is releasably connected to the motor housing, the brake caliper being adapted for selectively applying force to the brake disc. The brake disc is mechanically coupled with the hub. In one embodiment, the brake caliper is operably connectable and responsive to an hydraulic brake line on the chassis and configured to apply force to the brake disc in response to an hydraulic force on the hydraulic line. The invention includes a motor, which includes the rotor and the stator. In one embodiment, the motor is configured for regenerative braking. An embodiment of the invention also includes a mechanical parking brake caliper in the wheel cavity releasably connected to the motor housing and operably connectable to a park brake cable on the chassis.

The wheel motor traction assembly further includes a hub subassembly including a stub shaft, also referred to as a shaft, a hub rigidly connected to the stub shaft and removably connected to the rotor and to the wheel such that the hub and the stub shaft rotate with the rotor and the wheel, a shaft housing and a shaft bearing operatively connected to the stub shaft wherein the wheel and rotor rotate about the shaft bearing. The stator and the shaft housing are operatively connected and stationary with respect to the motor housing. The stub shaft, the rotor and the hub are rotatable with respect to the motor housing such that the bearing serves as a bearing for the rotor and for the wheel, and the motor, the hub subassembly and the motor housing substantially fit within the inner wheel parameter and the outer wheel parameter. The hub subassembly may further include a speed sensor and a position sensor located in the wheel cavity and operatively connected to the hub.

The wheel motor traction assembly includes a sealed power cable fitting operatively connected to the stator and to the motor housing, and adapted for connecting the stator to a power cable on the chassis.

The wheel motor traction assembly includes a wheel motor. The wheel motor is a compact disc-like axial flux motor for assembly within the vehicle wheel cavity. The wheel motor includes the non-rotatable motor housing, wherein the motor housing is configured as a disc that is sufficiently expansive to close the wheel cavity. The motor housing is sufficiently structural to at least partially support a vehicle chassis. The wheel motor includes the suspension system structural connector, also referred to as a vehicle suspension control arm pickup portion, on one side of the motor housing and the brake caliper on the other side of the motor housing. The motor stator is operatively connected to the motor housing. The wheel motor includes the rotatable hub and shaft wherein the hub and shaft are rotatably supported by the motor housing and are adapted for mounting the vehicle wheel. The wheel-motor includes the brake disc and the motor rotor wherein the brake disc and motor rotor are connected to the hub and shaft for rotation therewith. The brake disc is operatively connected to the brake caliper and the motor rotor is operably connectable to the stator. The wheel motor further includes a sensor connector port and a lower suspension control arm ball joint, also referred to as the lower suspension system structural connector, both located on the same side of the motor housing as the suspension control arm pickup portion.

The above objects, features and advantages, and other objects, features, and advantages, of the present invention are readily apparent from the following detailed description of the best mode for carrying out the invention when taken in connection with the accompanying drawings.

DESCRIPTION OF THE PREFERRED EMBODIMENT THE WHEEL MOTOR TRACTION ASSEMBLY

Figure 1:
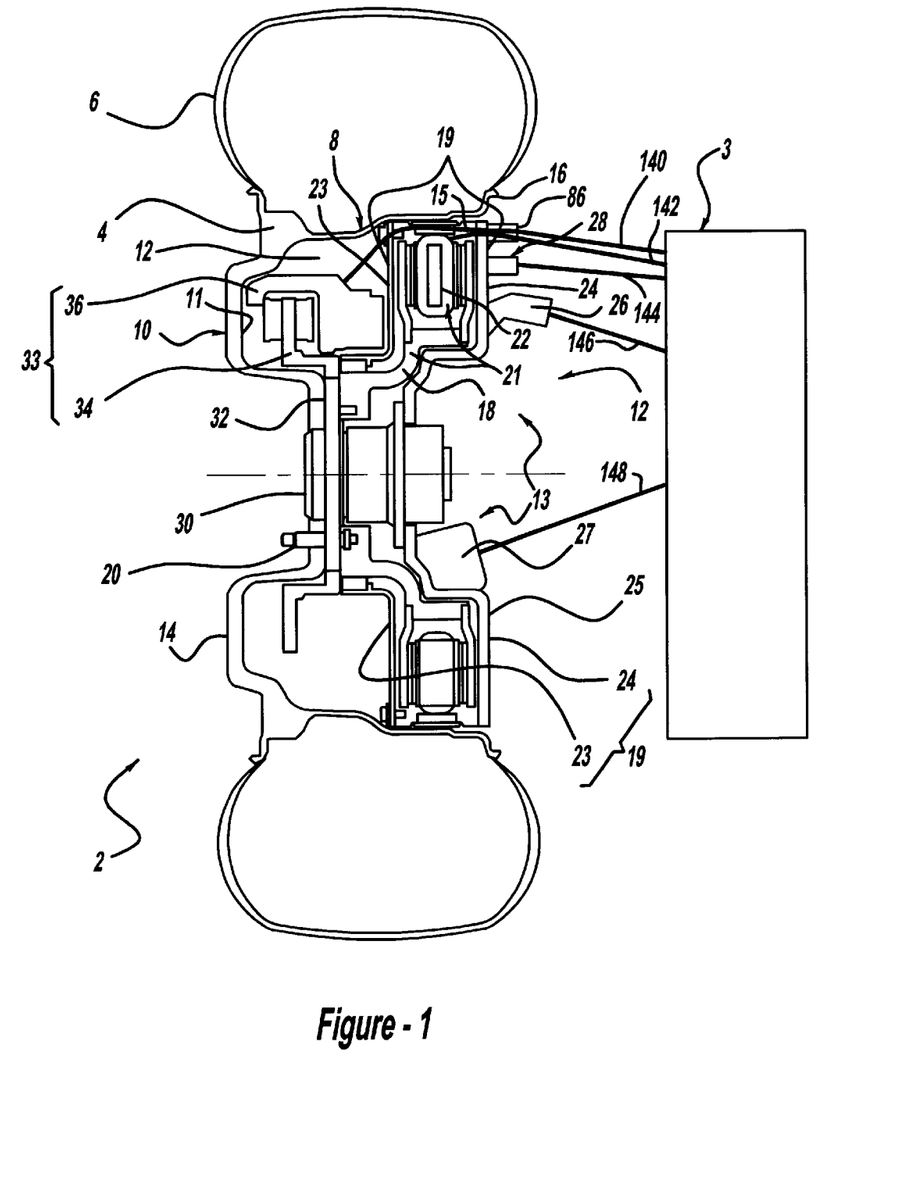
FIG. 1 is a schematic vertical cross-sectional view of one embodiment of the complete wheel motor traction assembly.

Referring to FIG. 1, a wheel motor traction assembly 2 for a light duty vehicle chassis 3 adaptable for electric traction, in accordance with the invention includes a rotatable wheel 4. A light duty vehicle includes any automotive car or truck marketed toward and typically used by consumers generally. A light duty vehicle adaptable for electric traction may include vehicles with an electric battery power supply, a fuel cell, or hybrid combinations of a fuel cell, an electric battery power supply or an internal combustion engine. In FIG. 1, a tire 6 is shown attached to the wheel 4. The wheel 4 has a radially outer tire support portion 8 and a radially inner hub support portion 10. The radially outer tire support portion 8 and the radially inner hub support portion 10 are cooperatively configured to define a wheel cavity 12 that is axially inwardly open with respect to the vehicle chassis 3 and has an inner wheel parameter 14 and an outer wheel parameter 16. The wheel has an inner side 11.

Figure 2:
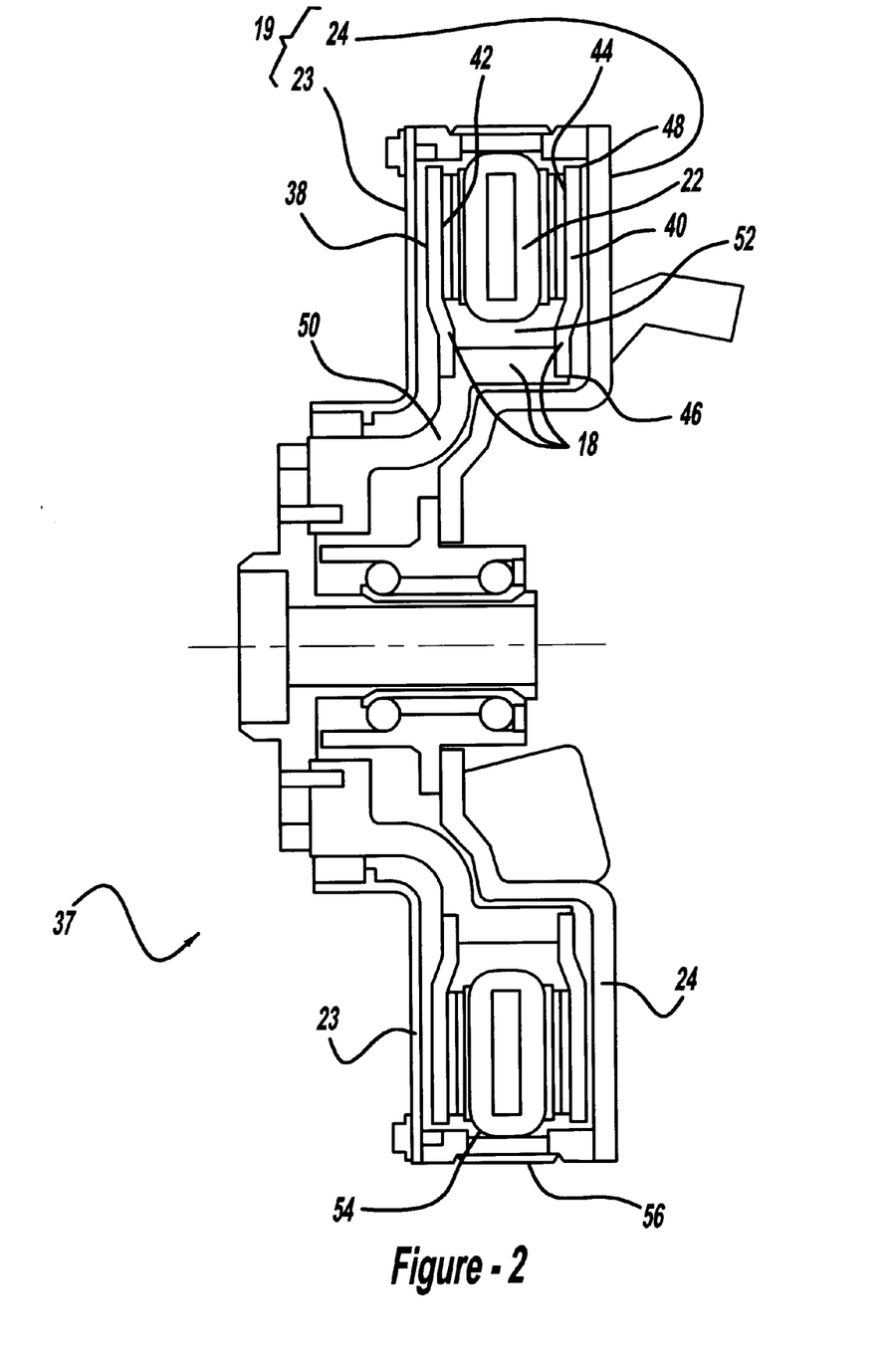
FIG. 2 is a schematic vertical cross-sectional view of the wheel motor in FIG. 1.

The embodiment of the wheel motor traction assembly 2 depicted in FIG. 1 also includes a wheel motor as shown in FIG. 2 having a rotor 18 in the wheel cavity 12 between the inner and outer wheel parameters 14, 16. The rotor 18 is removably connectable to the hub support portion 10 for drivingly rotating the wheel 4. The removable connectability of the rotor 18 and the hub support portion 10 is depicted in FIG. 1 by stud fasteners 58, 60, 62, 64, 66 shown in FIG. 3. The removability of the wheel 4 permits easy access to the wheel motor traction assembly 2 for any required maintenance and repairs. Those skilled in the art will recognize other means for connecting the rotor 18 and the hub support portion 10. A non-rotatable stator 22, also referred to as a motor stator, is shown in the wheel cavity 12 between the inner and the outer wheel parameters 14, 16. A motor 21 is comprised of the rotor 18 and the stator 22. A non-rotatable motor housing 19 with an axially outward portion 23 and an axially inward portion 24 configured to substantially close an inward end 13 of the inwardly open wheel cavity 12 is shown. The axially inward portion 24 of the motor housing is also referred to as one side of the motor housing and the axially outward portion 23 of the motor housing is also referred to as the other side of the motor housing. An electrical connector 15 connects the stator 22 to a sealed power cable fitting 86 shown rigidly mounted to the motor housing 19. The connection from the chassis to the stator is shown in FIG. 1 by a stator connection from chassis 142.

The non-rotatable motor housing 19 depicted in FIG. 1 further includes an exterior surface 25, adapted to face the chassis, to which is mounted an upper suspension system structural connector 26 and a lower suspension system structural connector 27 configured for connecting the wheel motor traction assembly 2 to a suspension system on the chassis 3, and a steering system structural connector 28 configured for connecting the wheel motor traction assembly 2 to a steering system on the chassis 3. The upper suspension system structural connector 26 is also referred to as a vehicle suspension control arm pickup portion. The lower suspension control arm 27 is also referred to as a lower suspension control arm ball joint. The motor housing 19 is of a sufficient strength to bear vehicle chassis loads when connected to a vehicle chassis suspension system and steering system via the suspension system structural connectors 26, 27 and the steering system structural connector 28. The connection from the chassis to the steering system structural connector 28 is depicted in FIG. 1 by a steering connection from chassis 142. The connection from the chassis to the upper suspension system structural connector 26 and to the lower suspension system structural connector 27 is shown by an upper and a lower suspension connection from the chassis 146, 148, respectively. The efficient packaging design of the motor 21 within the wheel cavity 12 reduces the total weight of the wheel motor traction assembly 2, thus reducing the total unsprung mass (i.e., mass centered axially outward of the vehicle suspension system) acting on the vehicle chassis 3. The combined function of the motor housing 19 as a connection location for a vehicle chassis steering system and a vehicle chassis suspension system allows further dimensional economy and minimization of unsprung mass.

The wheel motor traction assembly 2 depicted in FIG. 1 includes a hub subassembly 30. The hub subassembly 30 includes a hub 32. The wheel 4 is releasably attached to the hub 32. In FIG. 1, the releasable attachment is accomplished with a stud and nut set 20. When so attached, the wheel 4 is rotatable with the hub 32.

FIG. 1 shows a brake disc 34 operatively connected to the wheel 4 and to the rotor 18 and mechanically coupled with the hub 32. The brake disc 34 is rotatable with the hub 32. FIG. 1 also shows a brake caliper 36 mounted on and fixed with respect to the exterior surface 25 of the axially outer portion of motor housing 23 and operably connected to the brake disc 34. The brake disc 34 and the brake caliper 36 are together referred to as a brake subassembly 33. The connection from the chassis to the brake caliper 36 is shown in FIG. 1 by a brake connection from the chassis 140.

The Wheel Motor

Referring to FIG. 2, wherein like reference numbers refer to like components from FIG. 1, the wheel motor traction assembly 2 of FIG. 1 includes a wheel motor 37 that has a rotor 18 with structure forming an axially outer rotor ring disc 38 and an axially inner rotor ring disc 40. The rotor ring discs 38, 40 are also referred to as motor rotor discs. The axially outer rotor ring disc 38 and the axially inner rotor ring disc 40 each have an axial surface 42, 44 between an inner radius 46 and an outer radius 48. The rotor 18 further includes a rotor disc unit 50 rigidly connected to the axially inner rotor ring disc 40 and rigidly connected to the axially outer rotor ring disc 42 such that a rotor cavity 52 is formed between the axial surfaces 42, 44 of the rotor ring discs 38, 40. The stator 22 is located in the rotor cavity 52. The stator 22 has a radially outer surface 54.

The wheel motor 37 is a compact disc-like axial flux motor for assembly within the vehicle wheel cavity of FIG. 1. The wheel motor 37 includes the non-rotatable motor housing 19, wherein the motor housing 19 is configured as a disc that is sufficiently expansive to close the wheel cavity 12 of FIG. 1. The motor housing 19 is sufficiently structural to at least partially support the vehicle chassis 3 of FIG. 1. The wheel motor 37 includes the upper suspension system structural connector 26, shown in FIG. 1, also referred to as a vehicle suspension control arm pickup portion, on the axially inward portion 24 of the motor housing, also referred to as one side of the motor housing. The wheel motor 37 includes the brake caliper 36, shown in FIG. 1, on the axially outward side 23 of the motor housing, also referred to as the other side of the motor housing. The motor stator 22 is operatively connected to the motor housing 19. The wheel motor 37 includes the rotatable hub 32 and the stub shaft 88, also referred to as the shaft, both shown in FIG. 1, wherein the hub 32 and stub shaft 88 are rotatably supported by the motor housing 19 and are adapted for mounting the vehicle wheel 4 of FIG. 1. The wheel motor 37 includes the brake disc 34, shown in FIG. 1, and motor rotor 18 connected to the wheel hub 32 and shaft 88, both shown in FIG. 1, for rotation therewith. As shown in FIG. 1, the brake disc 34 is operatively connected to the brake caliper 36 and the motor rotor 18 is operably connectable to the stator 22. The wheel motor 37 further includes a sensor connector port 80, shown in FIG. 1, and a lower suspension control arm ball joint, also referred to as the lower suspension system structural connector 27, shown in FIG. 1, both located on the axially inward portion 24 of the motor housing, also referred to as the one side of the motor housing, which is the same side of the motor housing on which the upper suspension system structural connector 26, the suspension control arm pickup portion, is located.

In the wheel motor shown in FIG. 2, a liquid cooling ring 56 is rigidly connected to the radially outer surface 54 of the stator 22 for cooling the stator 22 and the rotor 18. The invention contemplates other mechanisms for cooling the stator 22 and rotor 18. Those skilled in the art will recognize a variety of means for dissipating heat from the stator 22 and rotor 18. The liquid cooling ring 56 is mechanically connected and stationary with respect to the motor housing 23, 24. The invention contemplates the use of a temperature sensor operatively connected to the motor for sensing the motor temperature and providing feedback regarding the temperature to a cooling control system on the vehicle chassis 3 shown in FIG. 1.

The Wheel Motor and Disc Brake Subassembly

Figure 3:
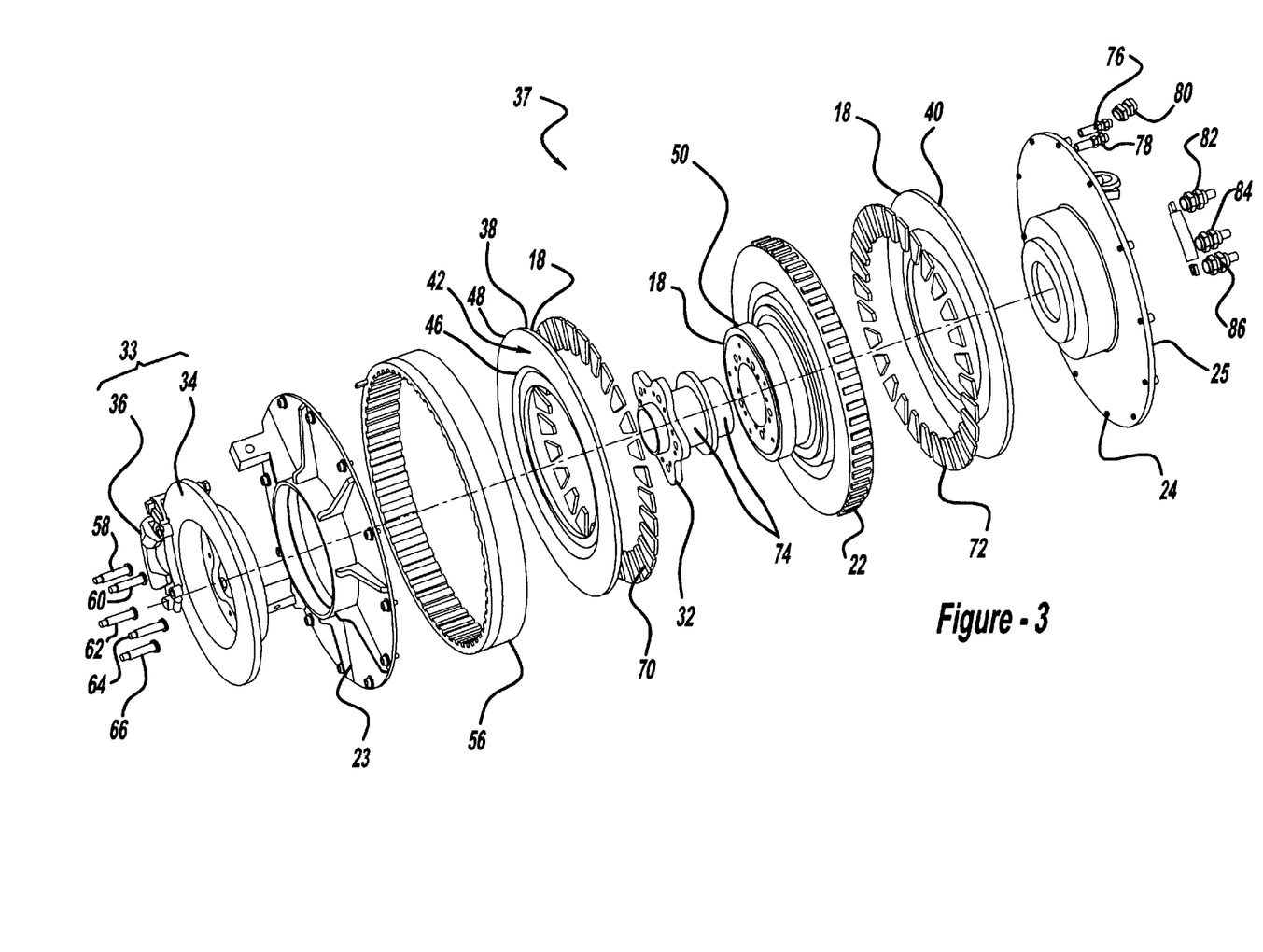
FIG. 3 is a perspective schematic exploded view of the wheel motor and disc brake subassembly in FIG. 1.

FIG. 3, wherein like reference numbers refer to like components from FIGS. 1, 2, shows parts of the wheel motor 37 and disc brake subassembly 33 in exploded view. From left to right, hub bolts 58, 60, 62, 64, 66 are shown for attaching the hub 32 to the rotor disc unit 50 portion of the rotor 18. To the right of the bolts 58, 60, 62, 64, 66 is the brake disc 34. The brake caliper 36 is shown operably connectable to the brake disc 34. The brake caliper 36 mounts to the axially outward portion of the motor housing 23, shown just to the right of the brake disc 34. Next, is the liquid cooling ring 56 which is operatively connected to the motor housing 23, 24. The liquid cooling ring 56 operatively connects to the radially outer surface of the stator 22, shown further to the right. Next, is the axially outer rotor ring disc 38 having an axial surface 42 between the inner radius 46 and the outer radius 48. The axially inner rotor ring disc 40 is shown further to the right. Further to the right, a set of magnets 70 is located around the entire periphery of the axially outer rotor ring disc 38. An electrical input to the stator 22 creates a force field about the magnets 70 which causes the rotor ring discs 40, 42 and the rotor disc unit 50 to rotate. Further to the right, more magnets 72 are located around the periphery of the axially inner rotor ring disc 40. In the center of the exploded view is the hub 32 and a shaft housing 74. Further to the right, is the axially inward portion of the motor housing 24. The axially outward portion of the motor housing 23 and the axially inward portion of the motor housing 24 are designed to connect, enclosing the liquid cooling ring 56, the hub 32, the rotor 18 and the stator 22, as well as the magnets 70, 72 within the wheel cavity depicted in FIG. 1. Further to the right, liquid cooling fittings 76, 78 are shown. The liquid cooling fittings 76, 78 mount to the exterior surface of the motor housing 25. The sensor connector port 80 is shown to the right of the liquid cooling fittings 76, 78. At the far right, sealed power cable fittings 82, 84, 86 are shown.

The Hub, Bearing, Sensor and Seal Subassembly

Figure 4A:
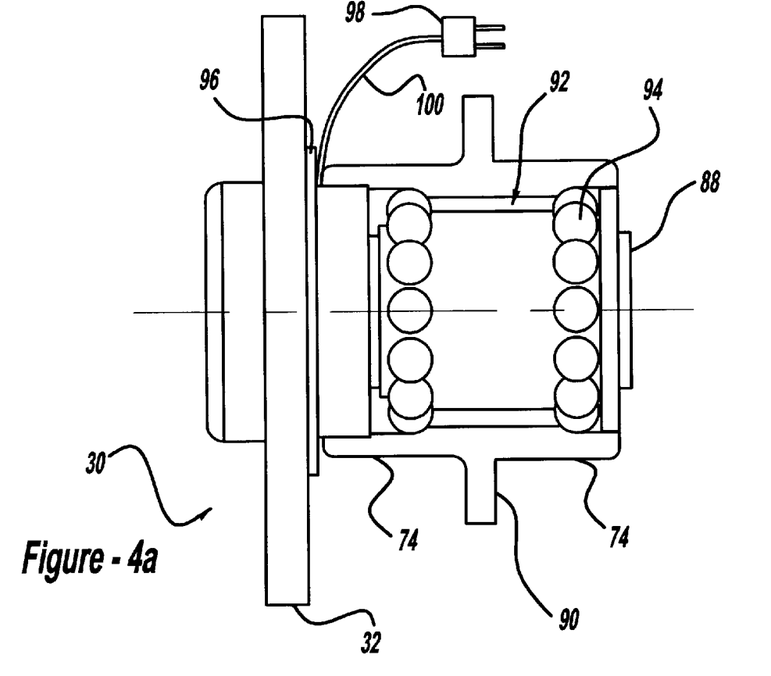
FIGS. 4a and 4b show a side schematic and perspective schematic views, respectively, of the hub, bearing, sensor and seal subassembly for use in the wheel motor of FIG. 2.
Figure 4B:
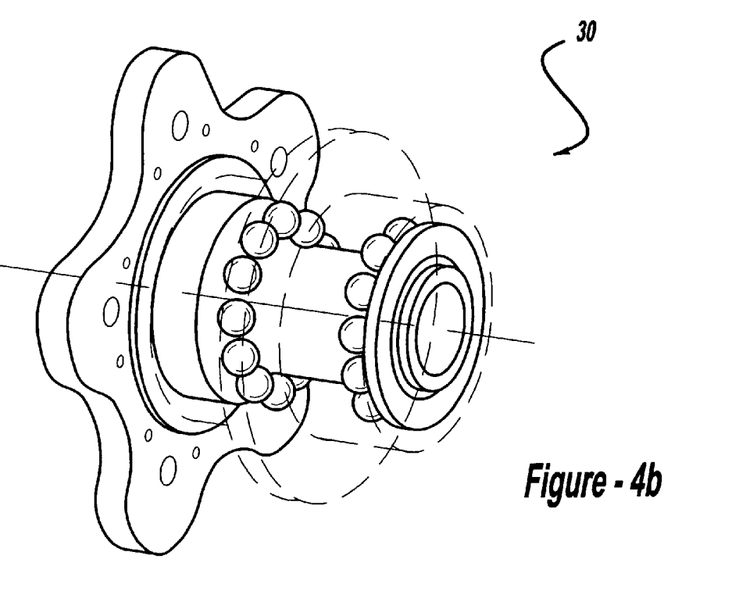

Referring to FIG. 4a, wherein like reference numbers refer to like components from FIGS. 1–3, the invention includes a hub subassembly 30. The hub subassembly 30 includes the hub 32 rigidly affixed to a stub shaft 88, also referred to as a shaft. The shaft housing 74 is located about the stub shaft 88, also referred to as the shaft. The shaft housing 74 includes a motor housing mounting 90 for operatively connecting the shaft housing 74 to the axially inward portion of the motor housing 24 shown in FIG. 1. As shown in FIG. 1, the rotatable hub 32 and the stub shaft 88 are rotatably supported by the motor housing 19 and are adapted for mounting the wheel 4. A sealed cavity 92 is formed between the stub shaft 88 and the shaft housing 74. A shaft bearing 94 is located in the sealed cavity 92 and is operatively connected to the stub shaft 88. The shaft bearing 94 also serves as a bearing for the wheel 4 shown in FIG. 1, eliminating the need for a separate wheel bearing and maximizing spatial efficiency. A hub sensor 96 is located in the shaft housing 74 and is operatively connected to the hub 32 such that the hub sensor 96 is capable of measuring the rotational speed of the hub 32 and the position of the hub 32 in relation to the position of the shaft housing 74, and is thus both a speed sensor and a position sensor. A connector port 98, serving as both a speed sensor connector port and a position sensor connector port in this embodiment, is operatively connected to the hub sensor 96. A hub sensor connector wire 100, which may be a speed sensor connector wire or a position sensor connector wire, is operatively connected to the hub sensor 96 at one end and to the connector port 98 at the other end. Thus, a sensor signal may be relayed from the hub sensor 96 to the hub sensor connector port 98. The hub sensor connector port 98 is capable of transmitting the sensor signal transmitted by the hub sensor 96. Those skilled in the art will recognize a variety of mechanisms and designs for sensing the shaft speed and position. FIG. 4b shows a side perspective schematic view of the hub subassembly 30. The invention also contemplates other sensors such as a temperature sensor operatively connected to the stator.

The Integrated Assembly

Figure 5A:
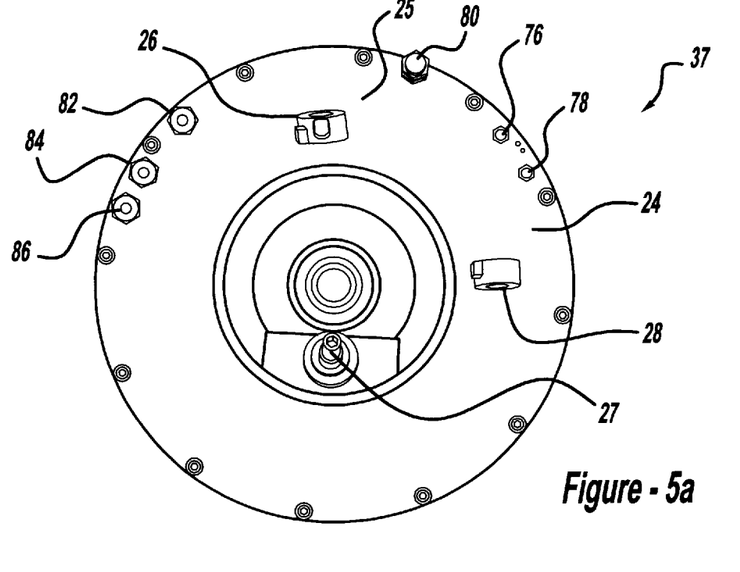
FIGS. 5a, 5b and 5c show axially back (inward), axially front (outward) and perspective schematic views, respectively, of an integrated assembly of the wheel motor and disc brake subassembly shown in FIG. 1.
Figure 5B:
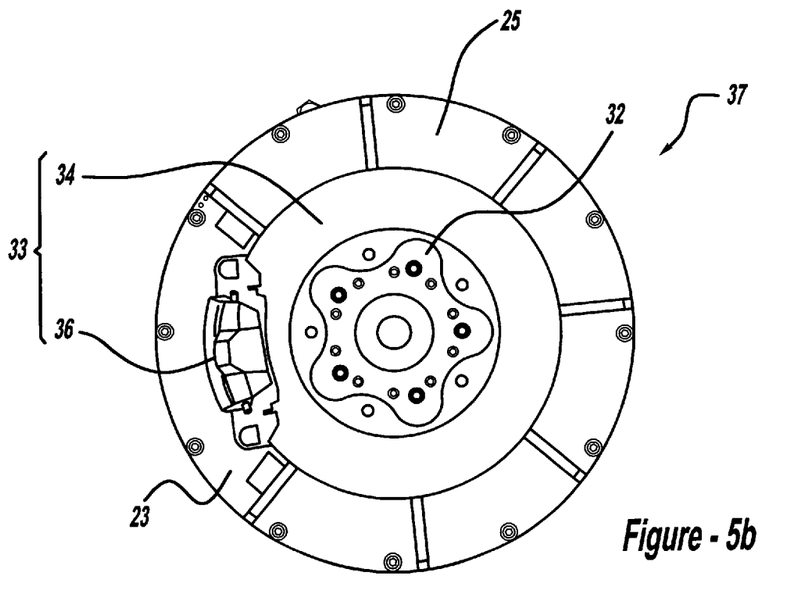

In an embodiment of the invention, as shown in FIG. 5a, wherein like reference numbers refer to like components of FIGS. 1–4, an axially inward view of the wheel motor 37 with the brake subassembly 33 is shown. The axially inward view shows the axially inward portion of the motor housing 24 with the upper and lower suspension system structural connectors 26, 27, liquid cooling fittings 76, 78 and steering system structural connector 28 mounted to the exterior surface of the motor housing 25. FIG. 5b, wherein like reference numbers refer to like components of FIGS. 1–5a, shows an axially outward view of the wheel motor 37 shown in FIG. 5a, with the brake disc 34 mechanically coupled to the hub 32. In this embodiment, the mechanical coupling is accomplished by the brake disc 34 having structure forming a cavity, partially visible in FIG. 3, that complements the geometrical shape of the hub 32 as shown in FIG. 5a. The brake caliper 36 is mechanically mounted to an exterior surface of the motor housing 25 on the axially outer portion of the motor housing 23 and is positioned to be operably connectable with the brake disc 34.

Figure 5C:
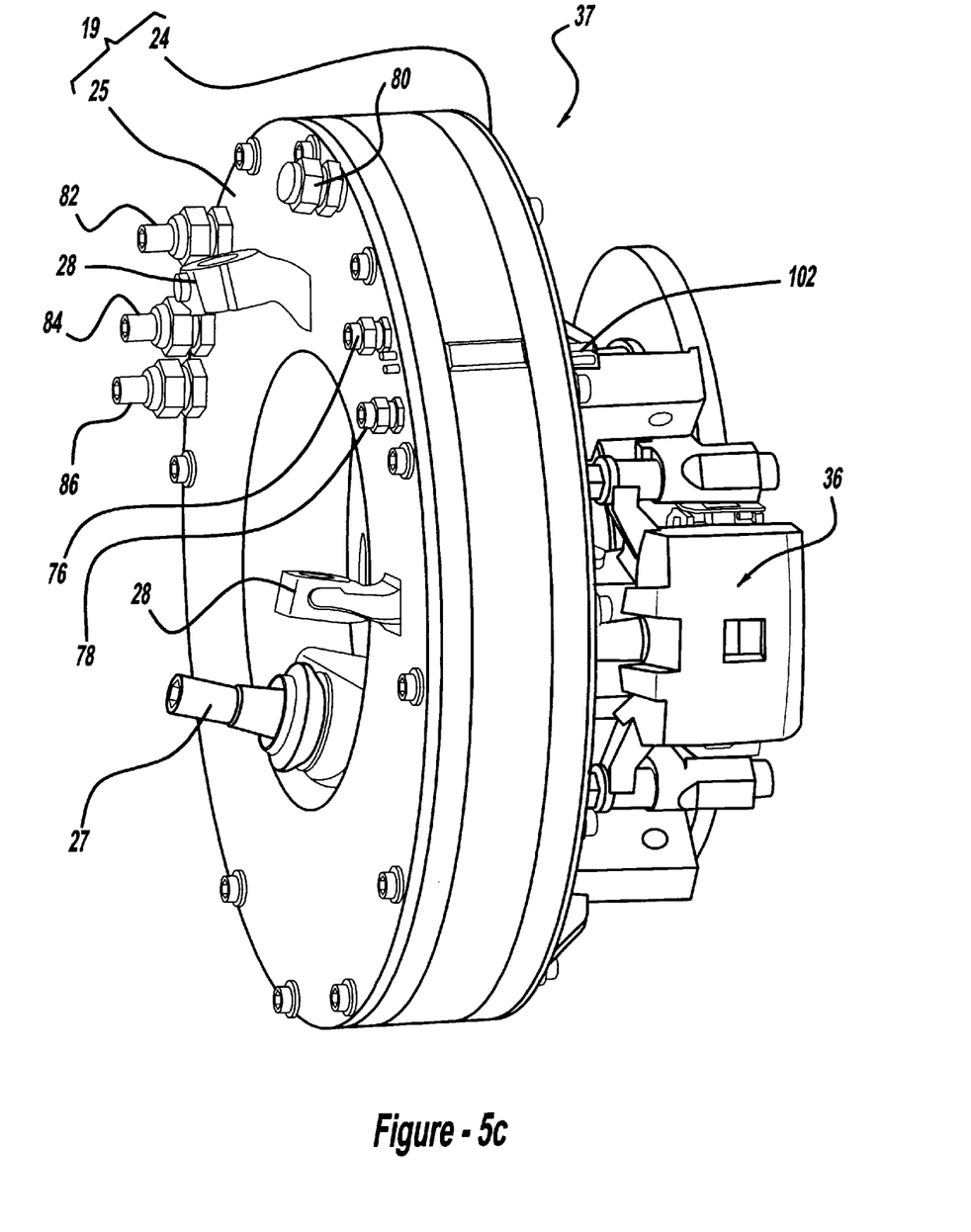

A perspective view of the wheel motor 37 and the brake subassembly 33 of FIG. 5a is shown in FIG. 5c. This embodiment of the invention includes hydraulic line pass-through structure 102 on the motor housing 19, adapted to permit a hydraulic line on the chassis 3 shown in FIG. 1 to pass through the axially inward and outward portions of the motor housing 23, 24 to the brake caliper 36. The invention includes other non-hydraulic types of brakes as well. Those skilled in the art will recognize a variety of braking mechanisms suitable for use on the wheel of a light duty vehicle.

The Regenerative Braking System

Figure 6:
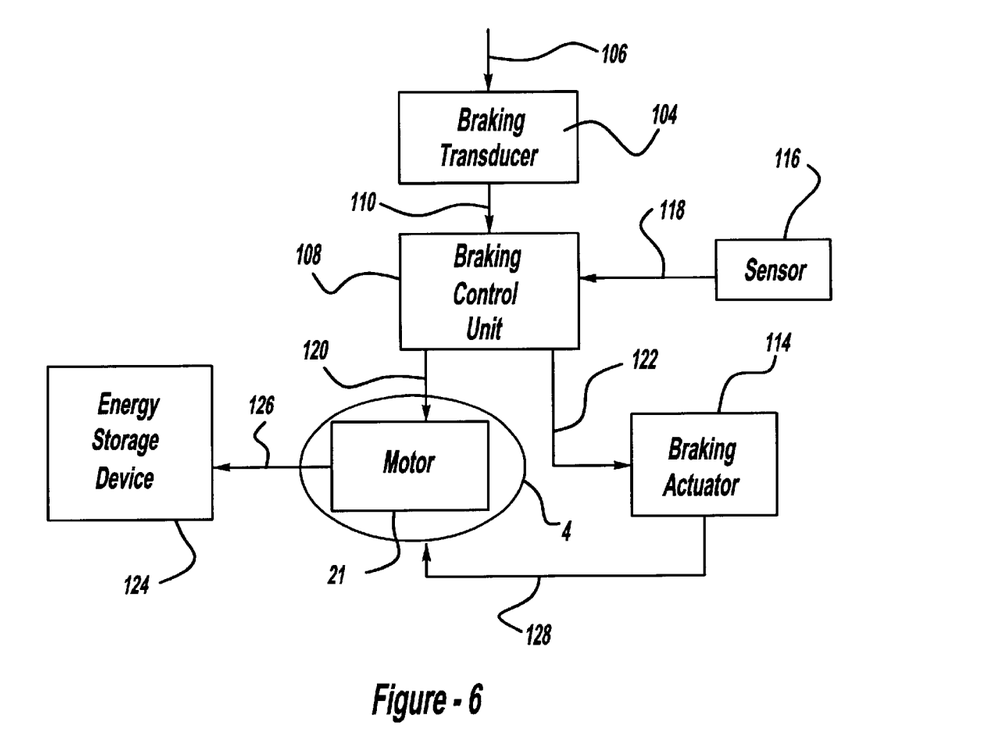
FIG. 6 is a schematic illustration of a regenerative braking system for use with the wheel motor traction assembly of FIG. 1.

Referring to FIG. 6, wherein like reference numbers refer to like components from FIGS. 1–5c, a schematic illustration of a regenerative braking system for use in one embodiment of the invention is shown. The schematic shows a braking transducer 104 located on a vehicle (not shown). A mechanical input force 106, such as force on a brake pedal or a force on hand-grip brake controls, is applied to the braking transducer 104. The braking transducer 104 is operatively connected to a braking control unit 108, which, in one embodiment, is located on the vehicle. The braking transducer 104 converts the mechanical input force 106 into a braking control unit input signal 110. The braking control unit input signal 110 is relayed to the braking control unit 108. The braking control unit 108 is operatively connected to the motor 21, to a braking actuator 114 and to a sensor 116. The sensor relays vehicle information, such as vehicle speed, to the braking control unit 108 via a sensor signal 118.

The braking control unit 108 analyzes the braking control unit input signal 110 and the sensor signal 118 and selectively sends either a motor control signal 120 to the motor 21 or a braking actuator control signal 122 to the braking actuator 114, or both, according to a pre-programmed algorithm. The motor 21 is operatively connected to an energy storage device 124. The motor control signal 120 closes a circuit 126 between the motor 21 and the energy storage device 124 causing the motor to divert some of its energy content in the form of electrical energy to the energy storage device 124. This draining of electrical energy to the energy storage device 124 causes the motor 21 to slow while capturing the electrical energy in the energy storage device 124 for later use. The braking control unit 108 may also send a braking actuator control signal 122 to the braking actuator 114, causing the braking actuator 114 to apply mechanical force 128 to the wheel 4. The invention also includes other configurations of regenerative braking systems.

Parking Brake Caliper

Figure 7A:
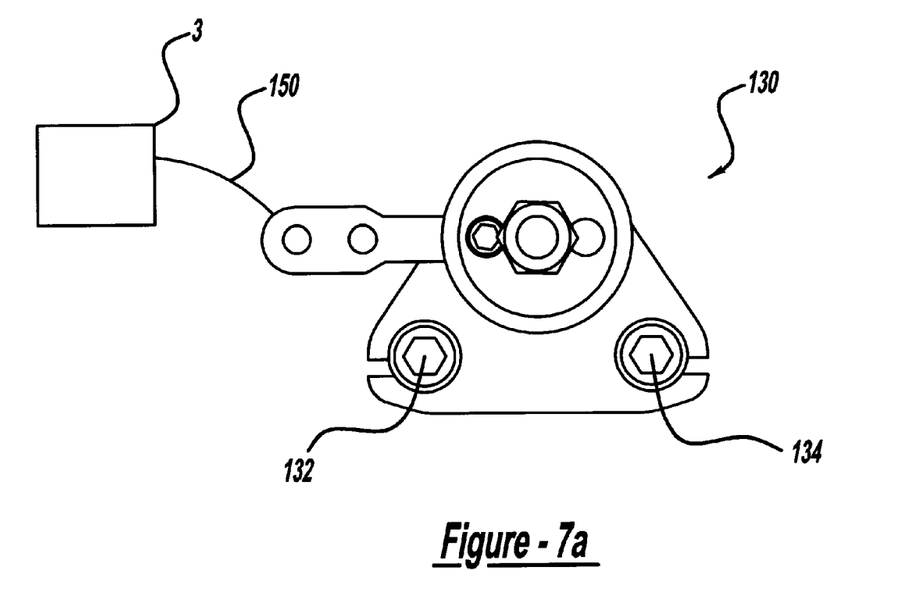
FIGS. 7a and 7b are front and side view schematic illustrations, respectively, of a parking brake for use with the wheel motor traction assembly of FIG. 1.
Figure 7B:
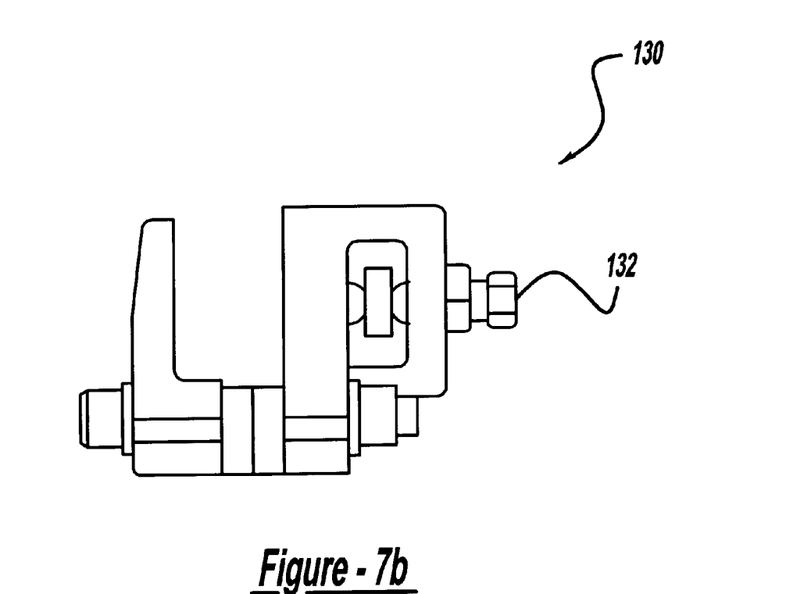

FIGS. 7a and 7b show a front and a side schematic view of a mechanical parking brake caliper 130 used in an embodiment of the invention. The parking brake caliper 130 is releasably mountable to the axially outward portion of the motor housing 23 (shown in FIG. 1) by use of park brake caliper bolts 132, 134. The connection from the chassis 3 to the parking brake caliper 130 is shown in FIG. 7a by a parking brake cable connection from the chassis 150. Other methods of mounting the parking brake caliper 130 to the motor housing 23 will be readily known to those skilled in the art.

Tire and Wheel Assembly

Figure 8A:
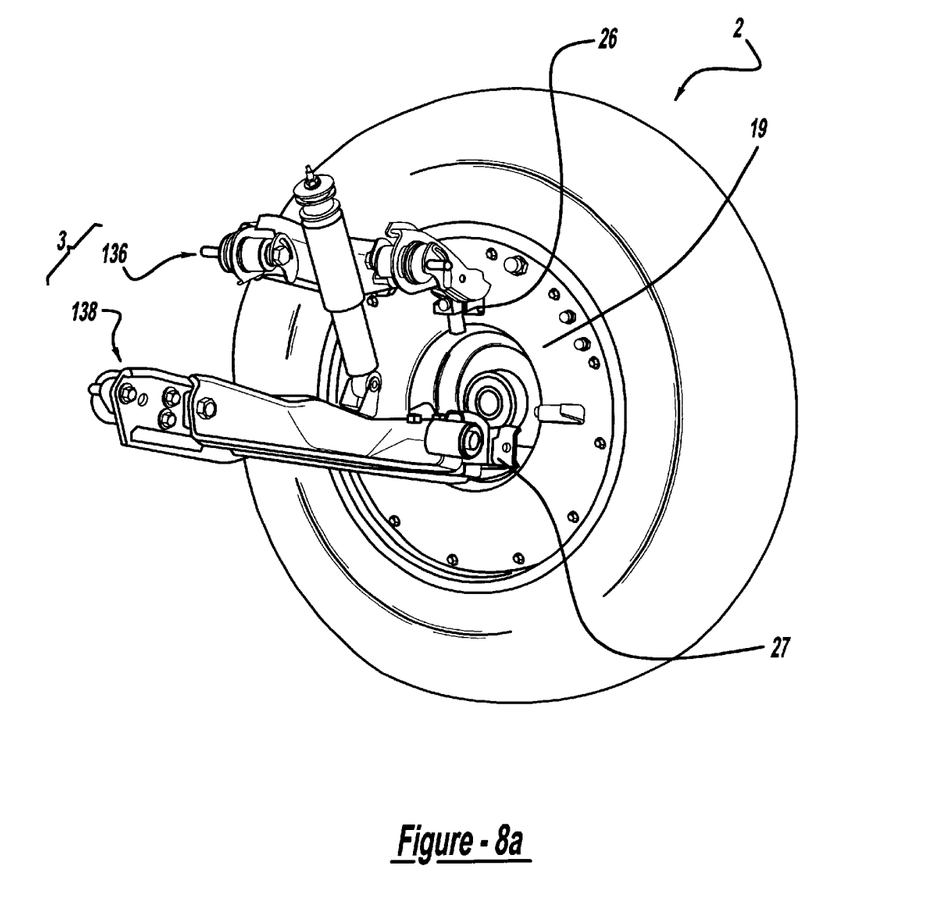
FIGS. 8a and 8b are front and rear perspective schematic illustrations of the wheel motor traction assembly of FIG. 1 with upper and lower suspension control arms of a vehicle attached.
Figure 8B:
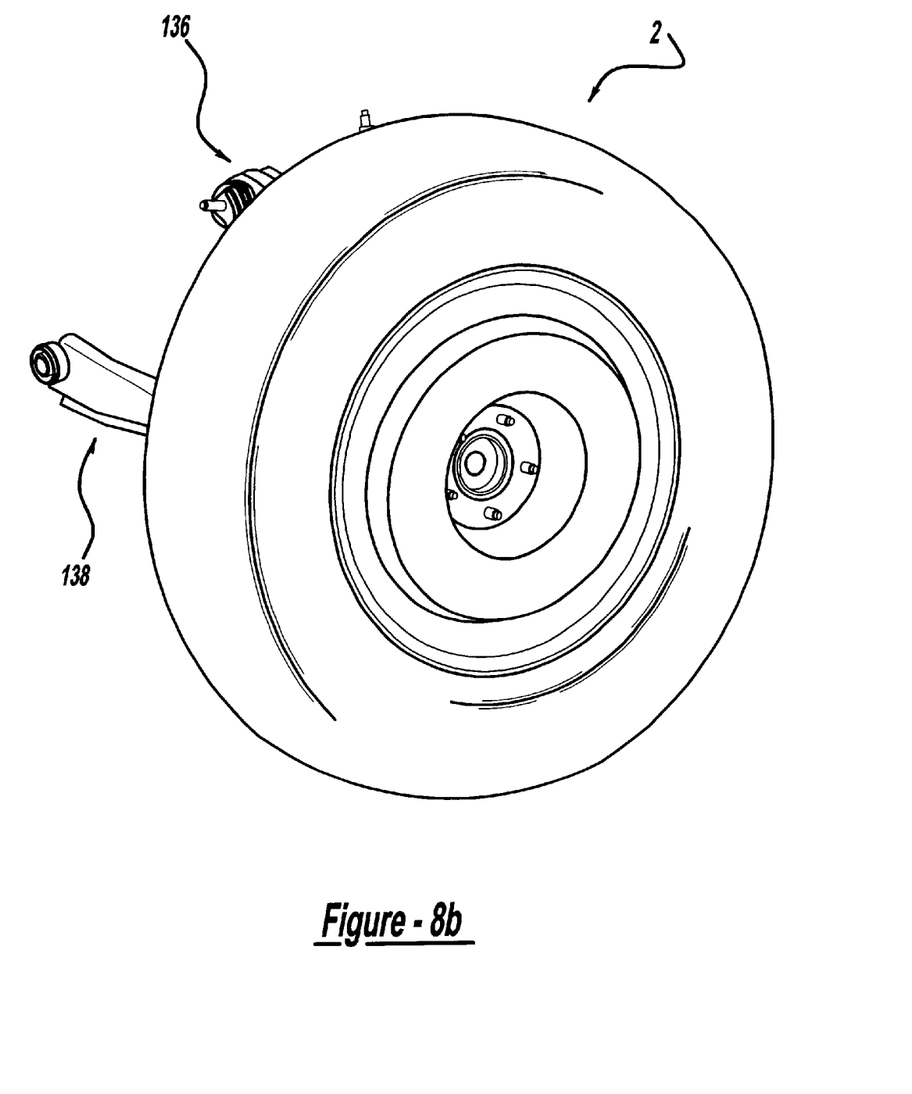

FIGS. 8a and 8b, wherein like reference numbers refer to like components from FIGS. 1–7b, are front and rear view perspective schematic illustrations of the wheel motor traction assembly 2 of FIG. 1. FIGS. 8a and 8b show an upper suspension control arm 136 and a lower suspension control arm 138 (both of which are part of the chassis 3) rigidly mounted to the motor housing 19 at the upper suspension system structural connector 26 and the lower suspension system structural connector 27. The invention contemplates other attachment configurations for the suspension control arms 136, 138.

Thus, referring to FIG. 1, the wheel 4 has an electric motor 21 operatively connected within the wheel 4 for drivingly rotating the wheel 4. The electric motor 21 has a motor housing 19. A steering system structural connector 28 is operatively connected to the motor housing 19 for connecting the wheel motor traction assembly 2 to a steering system on the chassis 3. As depicted in FIG. 8a, the upper suspension system structural connector 26 and the lower suspension system structural connector 27 are operatively connected to the motor housing 19 for connecting the wheel motor traction assembly 2 to a suspension system on the chassis 3. The motor housing 19 is configured to bear vehicle loads as it structurally interconnects the wheel 4 with the chassis 3 through the suspension system structural connectors 26, 27 and the steering system structural connector 28. In other words, the motor housing 19 is sufficiently structural to at least partially support the vehicle chassis 3.

While the best modes for carrying out the invention have been described in detail, those familiar with the art to which this invention relates will recognize various alternative designs and embodiments for practicing the invention within the scope of the appended claims.

What is claimed is:

1. A wheel motor traction assembly for a light duty vehicle chassis adaptable for electric traction comprising:
a rotatable wheel having an inner side relative to the chassis;
an electric motor operatively connected to the inner side of the wheel for drivingly rotating the wheel and having a motor housing;
a suspension system structural connector operatively connected to the motor housing for connecting the wheel motor traction assembly to a suspension system on the vehicle chassis; and a steering system structural connector operatively connected to the motor housing for connecting the wheel motor traction assembly to a steering system on the vehicle chassis;

wherein the motor housing is configured to bear vehicle chassis loads as the motor housing structurally interconnects the wheel with the chassis through the suspension system structural connector and the steering system structural connector.

2. The wheel motor traction assembly of claim 1, further comprising:

a rotatable brake disc operatively connected to the wheel for rotation with the wheel;

a brake caliper operatively connected to the brake disc;

wherein the brake caliper is operatively connected to the motor housing.

3. The wheel motor traction assembly of claim 1:

wherein the electric motor includes a stator and a rotor; and further comprising:

a shaft bearing operatively connected to the electric motor such that the rotor is rotatable about the shaft bearing; and wherein the wheel is rotatable about the shaft bearing.

4. A wheel motor traction assembly for a light duty vehicle chassis comprising:

a rotatable wheel having a radially outer tire support portion and a radially inner hub support portion, said portions being cooperatively configured to define a wheel cavity axially inwardly open with respect to the chassis and having inner and outer wheel parameters;

a rotor in the wheel cavity between said parameters and removably connectable to said hub support portion for drivingly rotating the wheel;

a non-rotatable stator in the wheel cavity between said parameters for drivingly rotating the rotor; and a non-rotatable motor housing configured to substantially close an inward end of the inwardly open wheel cavity and including a structural connector and an electrical connector, said structural connector and said electrical connector being adapted for connecting the wheel motor traction assembly to the chassis.

5. The wheel motor traction assembly of claim 4, wherein the structural connector is a suspension system structural connector configured for connecting the wheel motor traction assembly to a suspension system on the chassis.

6. The wheel motor traction assembly of claim 4, wherein the structural connector is a steering system structural connector configured for connecting the wheel motor traction assembly to a steering system on the chassis.

7. The wheel motor traction assembly of claim 4, further comprising:

a rotatable brake disc in the wheel cavity operatively connected to the rotor; and a brake caliper in the wheel cavity releasably connected to said motor housing, wherein the brake caliper is adapted for selectively applying force to the brake disc.

8. The wheel motor traction assembly of claim 4, wherein the brake caliper is operably connectable to an hydraulic brake line on the chassis and configured to apply force to the brake disc in response to an hydraulic force in the hydraulic line.

9. The wheel motor traction assembly of claim 4, further comprising a mechanical park brake caliper in the wheel cavity releasably connected to the motor housing and operably connectable to a park brake cable on the chassis and configured for applying force to the brake disc in response to a force on the park brake cable.

10. The wheel motor traction assembly of claim 4, further comprising:

a hub subassembly including:

a stub shaft;

a hub rigidly connected to the stub shaft and removably connected to the rotor and to the wheel such that the hub and the stub shaft rotate with the rotor and the wheel;

a shaft housing operatively connected to the stub shaft; and a shaft bearing operatively connected to the stub shaft wherein the wheel and the rotor rotate about the shaft bearing.

11. The wheel motor traction assembly of claim 10, wherein the hub subassembly further includes:

a speed sensor located in the wheel cavity and operatively connected to the hub and capable of measuring the rotational speed of the hub;

a speed sensor connector port rigidly fixed to the motor housing; and a speed sensor connector wire operatively connected at one end to the speed sensor and operatively connected at the other end to the speed sensor connector port.

12. The wheel motor traction assembly of claim 10, wherein the hub subassembly further includes:

a position sensor located in the wheel cavity and operatively connected to the hub and to the shaft housing and capable of sensing the position of the hub in relation to the position of the shaft housing;

a position sensor connector port rigidly affixed to the motor housing; and a position sensor connector wire operatively connected to the position sensor at one end and operatively connected at the other end to the position sensor connector port.

13. The wheel motor traction assembly of claim 7, wherein the rotor and stator comprise a motor which is configured for regenerative braking.

14. A wheel motor traction assembly for a light duty vehicle chassis adaptable for electric traction comprising:

a rotatable wheel having a radially outer tire support portion and a radially inner hub support portion, said portions being cooperatively configured to define a wheel cavity axially inwardly open with respect to the chassis and having inner and outer wheel parameters;

a rotor in the cavity between said parameters and removably connectable to said hub support portion for drivingly rotating the wheel;

a non-rotatable stator in the cavity between said parameters for drivingly rotating the rotor;

a non-rotatable motor housing configured to substantially close an inward end of the inwardly open wheel cavity and including an electrical connector, a suspension system structural connector configured for connecting the wheel motor traction assembly to a suspension system on the chassis and a steering system structural connector configured for connecting the wheel motor traction assembly to a steering system on the chassis, said connectors being adapted for connecting the wheel motor traction assembly to the chassis.

15. A wheel motor traction assembly for a light duty vehicle chassis adaptable for electric traction comprising:

a motor including a non-rotatable stator and a rotor;

a hub subassembly including a stub shaft, a hub rigidly connected to the stub shaft and mechanically coupled to the rotor such that the hub and stub shaft rotate with the rotor, a shaft housing and a shaft bearing, both operatively connected to the stub shaft, wherein the wheel and the rotor rotate about the shaft bearing;

a wheel having a radially outer tire support portion and a radially inner hub support portion, said portions being cooperatively configured to define a wheel cavity axially inwardly open with respect to the chassis, and having inner and outer wheel parameters, wherein the wheel is removably connected to the hub such that the wheel is rotatable with the hub;

a non-rotatable motor housing supporting the shaft housing and configured to substantially close an inward end of the inwardly open wheel cavity;

a steering system structural connector operatively connected to the motor housing for connecting the wheel motor traction assembly to a steering link on the chassis, and a suspension system structural connector operatively connected to the motor housing for connecting the wheel motor traction assembly to a suspension system on the chassis;

a brake disc in the wheel cavity mechanically coupled with the hub such that the brake disc is rotatable with the hub, and a brake caliper in the wheel cavity mounted on and fixed with respect to the motor housing and operably connectable to the brake disc; and a sealed power cable fitting operatively connected to the motor housing and to the stator and adapted for connecting the stator to a power cable on the chassis;

wherein the stator and the shaft housing are operatively connected and stationary with respect to the motor housing, and wherein the stub shaft, the rotor, the hub and the wheel are rotatable with respect to the motor housing such that the shaft bearing serves as a bearing for the rotor and for the wheel, and the motor, the hub subassembly and the motor housing substantially fit within the inner wheel parameter and the outer wheel parameter.

16. A compact disc-like axial flux motor for assembly within a vehicle wheel cavity and comprising:

a nonrotatable motor housing configured as a disc sufficiently expansive to close a wheel cavity and including a vehicle suspension control arm pickup portion on one side thereof, a brake caliper on the other side thereof, and a motor stator that is operatively connected to the motor housing, wherein the motor housing is sufficiently structural to at least partially support a vehicle chassis;

a rotatable hub and shaft rotatably supported by the motor housing, wherein the hub is adapted for supporting a vehicle wheel; and a brake disc and motor rotor connected to the hub and shaft for rotation therewith;

wherein the brake disc is operably connectable to the brake caliper and the motor rotor is operably connectable to the stator.

17. The axial flux motor of claim 16 further comprising a sensor connector port on the one side of the motor housing.

18. The axial flux motor of claim 17 further comprising a lower suspension control arm ball joint on the one side of the motor housing.

* * * * *